(No Model.)
W. CRABB.
COMB.
No. 294,204. Patented Feb. 26, 1884.
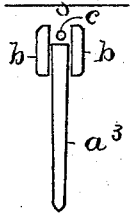
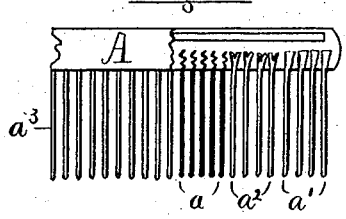
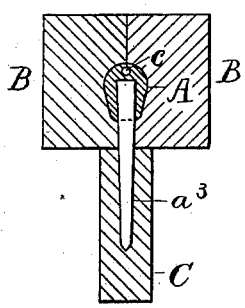
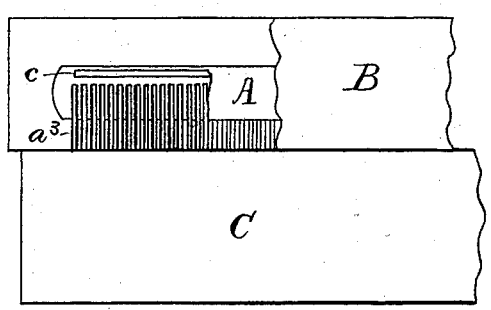
Witnesses.
Chas. L. Kennon
W. F. D. Crane
Inventor.
William Crabb per
Thos. S. Crane. Atty.

UNITED STATES PATENT OFFICE.

WILLIAM CRABB, OF NEWARK, NEW JERSEY.

COMB.

SPECIFICATION forming part of Letters Patent No. 294,204, dated February 26, 1884.

Application filed June 16, 1882. Renewed February 6, 1884. (No model.)

*To all whom it may concern:*

Be it known that I, WILLIAM CRABB, a citizen of the United States, residing in the city of Newark, Essex county, New Jersey, have invented certain new and useful Improvements in Combs, fully described and represented in the following specification and the accompanying drawings, forming a part of the same.

My invention consists in the herein described and claimed improvements in the manufacture of combs from a series of separate teeth.

For the purposes of my invention, the teeth may be made of metal, wood, ivory, bristles, or other suitable material, and are secured in the back by pressing celluloid or analogous material around the roots of the teeth in a mold. This operation is shown in the drawings as performed in a die having two sides, in each half of the die a suitable groove being made to shape one side of the comb back.

In the drawings annexed, Figure 1 represents a portion of a comb, one end of the back being shown in section to exhibit the roots of the teeth. Fig. 2 represents the arrangement of the parts to be pressed in the die, and Fig. 3 shows a section of the die closed upon the teeth and the back pressed to its finished shape. Fig. 4 is a side view of the die and the holder employed to support them therein, one part of the die being broken away to show the comb inside, a part of the latter being also cut open in the back to show the arrangement of the teeth in the die.

My method of making a comb consists in supporting a series of teeth in a die or mold adapted to press a back of plastic material upon and between the teeth; and the product claimed by me is a comb having a back formed by pressing plastic material upon the roots of a series of teeth.

In the drawings, A is the back of the comb; B B, the halves of the mold for shaping and pressing the same; C, a holder for supporting the series of teeth in the mold, and $a$ $a'$ $a^2$ $a^3$ different forms of teeth shown herein.

In Fig. 1, the back of the comb being cut away, shows the form of the roots provided upon three kinds of teeth, $a$ representing teeth formed of round pointed wires, with crimped ends adapted to hold fast in the back of a comb; $a'$, similar teeth having their root ends flattened, and $a^2$, teeth with their roots flattened and then split into a rough fork. $a^3$ represents a mode of forming the large teeth, usually flattened throughout their whole length in combs made by other processes. To form such teeth of metal, I make a tapered metallic blank of proper size, and flatten it by a blow or pressure, so as to produce a tooth flat in edge view, tapered in side view, and rounded somewhat upon its edges. Such I do not claim herein, the same being the subject of a separate application of mine. The flat form of such teeth is shown in Figs. 2 and 3 and the edge view in Figs. 1 and 4.

The above description of teeth relates to their manufacture of such materials as steel and brass; but I do not restrict myself to the use of any particular material, as teeth may be made of ivory, bone, wood, bristles, or other substances, and secured in a back of plastic material by pressure, as described.

The shoulder shown herein at C consists merely in a strip of metal formed with holes, in which the points of the teeth are placed, and from which their roots project a suitable distance to penetrate the mold nearly to the rear of the back.

In the figures I have shown a wire, $c$, inserted in the back in the rear of the roots of the teeth, for the purpose of strengthening the plastic material employed. Such wire is shown in Fig. 2 as lying between two strips, $b$, of the material used for forming the back, and above the roots of the teeth. Blanks of material are prepared and one of them laid in the die. The wire $c$ and teeth are then inserted in the die and the other strip laid upon them. The upper half of the die is then put in position and sufficient heat and pressure applied to press the same into a united mass, as shown in Fig. 3.

The only plastic materials adapted in practice to weld or flow into a compact mass under the influence of heat and pressure in a mold are celluloid and india-rubber, the former being adapted to unite teeth of all kinds of material, and the latter being suitable for use with any kind of teeth (as metal) that will stand the moderate temperature required to vulcanize rubber. Celluloid and the pyroxyline compounds of identical character are especially adapted for the purpose, as they can be made of various ornamental colors, and set in their permanent form as soon as they cool without the labor of vulcanizing.

The wire c is preferably of steel, tempered, or hard brass wire, and the same may be kept in place in the mold by projecting its ends through suitable holes in the ends of the molds, though this would necessitate the cutting off of the projecting ends from the back of the mold when finished.

It is obvious that instead of two strips of plastic material arranged in the die, as shown, a single strip of U form can be employed and the roots of the teeth placed in its open mouth before pressing in the die. In such case the wire c could be cemented in the bottom of the U and thus kept in place in the mold.

I am aware that a provisional English specification describes a method of casting a back upon wire teeth, and a method of pressing a back upon teeth placed in previously-drilled holes; but my invention is intended both to obviate the difficulties of operating with metal and to produce a lighter and handsomer product by the use of celluloid and analogous materials, which, it is well known, can be made of any desired color. My method also enables me to unite teeth of ivory or bone to an ornamental back while such materials would not endure either the casting of metal upon them or the pressing of a metal back about them. The use of such yielding material as celluloid also enables me to make the roots of the teeth by any of the methods herein shown, which would not be possible on account of their shapes if they were to be secured in round drilled holes.

I am also aware that British Patent No. 4,558 of 1879 shows a method of uniting wire teeth to a back formed of solid material; but such back not being pressed while in a soft condition between the roots of the teeth, the latter require some cement or composition inserted between them, and are more expensive and difficult to manufacture than mine.

I am also aware that combs have been made with teeth and back integral of celluloid and india-rubber; and I therefore disclaim any such article as well as the methods set forth in the British patents cited above, and limit my manufacture exclusively to the use of india-rubber and celluloid or similar materials adapted by their constitution to soften and weld below a temperature of 350° Fahrenheit. The mold employed in my manufacture need not be made of any material harder than good brass; and it is therefore obvious that my process of manufacture does not contemplate the working of metals either hot or cold, but only the use of the materials referred to above, and which are adapted under the temperature named to flow around the roots of the wire teeth and wholly inclose and support them.

Having thus distinguished the material I use, which cannot be reduced to a fluid or melted state, but only softened enough to mold, from the melted or pressed metal back referred to above, I claim my invention as follows:

1. The method herein described for forming a comb-back of celluloid or analogous material upon a series of separate teeth, consisting in supporting the series of teeth in one half of a divided mold with a strip or strips of material adapted to yield under pressure below a temperature of 300° Fahrenheit, and then applying the other half of the mold and causing the material to flow in a plastic state around and between the roots of the teeth, substantially as shown and described.

2. In combination with a comb-back of the nature herein described, the teeth a, provided with crimped ends, substantially as shown and described.

In testimony whereof I have hereunto set my hand in the presence of two subscribing witnesses.

WILLIAM CRABB.

Witnesses:
A. VAN ARSDALE,
JACOB F. GULIC.